(12) United States Patent
Chen et al.

(10) Patent No.: US 11,858,187 B2
(45) Date of Patent: Jan. 2, 2024

(54) MOLD APPARATUS INCLUDING MOLD SENSOR COOLING STRUCTURE

(71) Applicant: Chung Yuan Christian University, Taoyuan (TW)

(72) Inventors: Shia-Chung Chen, Taoyuan (TW); Yung-Hsiang Chang, Taoyuan (TW); Yan-Xiang Liang, Taoyuan (TW); Yu-Hung Ting, Taoyuan (TW)

(73) Assignee: Chung Yuan Christian University, Taoyuan (TW)

( * ) Notice: Subject to any disclaimer, the term of this patent is extended or adjusted under 35 U.S.C. 154(b) by 0 days.

(21) Appl. No.: 17/848,398

(22) Filed: Jun. 24, 2022

(65) Prior Publication Data

US 2023/0330904 A1    Oct. 19, 2023

(30) Foreign Application Priority Data

Apr. 18, 2022  (TW) .................. 111114573

(51) Int. Cl.
B29C 45/27 (2006.01)
B29C 45/73 (2006.01)
B29C 45/78 (2006.01)

(52) U.S. Cl.
CPC ...... B29C 45/2737 (2013.01); B29C 45/7312 (2013.01); B29C 45/78 (2013.01); *B29C 2945/7604* (2013.01); *B29C 2945/76274* (2013.01)

(58) Field of Classification Search
CPC .................. B29C 45/401; B29C 2045/274
See application file for complete search history.

(56) References Cited

U.S. PATENT DOCUMENTS

| 7,841,854 | B2 | 11/2010 | Ota et al. |
| 2008/0085334 | A1* | 4/2008 | Barnett .................. B29C 45/78 425/110 |
| 2011/0151041 | A1* | 6/2011 | Groleau ............... B29C 45/401 425/139 |
| 2020/0206999 | A1* | 7/2020 | Tsai ..................... G01L 9/0001 |
| 2021/0165161 | A1* | 6/2021 | Sekiguchi ............. G02B 6/389 |

FOREIGN PATENT DOCUMENTS

| CN | 113492502 A | * 10/2021 |
| CN | 113715281 | 11/2021 |
| JP | S6368254 | 3/1988 |
| JP | H1183657 | 3/1999 |
| JP | 2008014686 | 1/2008 |
| JP | 2015030180 | 2/2015 |
| JP | 2015163470 | 9/2015 |
| JP | 6628746 | 1/2020 |
| KR | 20130005259 U | * 9/2013 |
| TW | M582896 | 9/2019 |

OTHER PUBLICATIONS

"Office Action of Japan Counterpart Application", dated Aug. 4, 2023, p. 1-p. 3.

* cited by examiner

*Primary Examiner* — Alison L Hindenlang
*Assistant Examiner* — Virak Nguon
(74) *Attorney, Agent, or Firm* — JCIPRNET

(57) ABSTRACT

A mold apparatus including a mold, a cooling flow path, and a sensing module is provided. The mold has a cavity. The sensing module is adapted to sense at least one of a temperature and a pressure in the cavity. The sensing module is surrounded by the cooling flow path.

7 Claims, 6 Drawing Sheets

MOLD APPARATUS INCLUDING MOLD SENSOR COOLING STRUCTURE

CROSS-REFERENCE TO RELATED APPLICATION

This application claims the priority benefit of Taiwan application serial no. 111114573, filed on Apr. 18, 2022. The entirety of the above-mentioned patent application is hereby incorporated by reference herein and made a part of this specification.

BACKGROUND

Technical Field

The disclosure relates to a mold apparatus, and more particularly, to a mold apparatus including a mold sensor cooling structure.

Related Art

In an injection molding process, the temperature of a mold is raised to a specified temperature according to different materials. With some high temperature materials, the mold temperature may exceed the upper limit of a sensor, or the mold temperature may be raised to an even higher temperature according to different product requirements. Such a high mold temperature will damage the sensor, so the use of the sensor is limited by the mold temperature. Therefore, how to prevent the sensor from being damaged at a higher mold temperature is an issue to be solved in the art.

SUMMARY

The disclosure provides a mold apparatus adapted to prevent damage to a sensing module at a higher mold temperature to improve applicability of the mold apparatus in different processes.

A mold apparatus according to an embodiment of the disclosure includes a mold, a cooling flow path, and a sensing module. The mold has a cavity. The sensing module is adapted to sense at least one of a temperature and a pressure in the cavity. The sensing module is surrounded by the cooling flow path.

In an embodiment of the disclosure, the mold apparatus further includes a bearing structure. The sensing module includes a temperature sensor and a pressure sensor. The temperature sensor has a sensing portion and an abutting portion, the sensing portion is located in the mold, and the abutting portion is located in the bearing structure. The pressure sensor is disposed in the bearing structure and corresponds to the abutting portion, and the abutting portion is adapted to abut against the pressure sensor by the pressure in the cavity.

In an embodiment of the disclosure, the cooling flow path is located in the bearing structure.

In an embodiment of the disclosure, the temperature sensor is an ejector-pin-type temperature sensor, and the bearing structure is an ejector plate structure.

In an embodiment of the disclosure, the temperature sensor is an optical fiber temperature sensor and includes a light receiving unit, and the light receiving unit is disposed at the abutting portion.

In an embodiment of the disclosure, the mold apparatus further includes a protection structure. The protection structure covers the abutting portion, and the cooling flow path is located in the protection structure.

In an embodiment of the disclosure, the mold apparatus further includes a protection structure. The protection structure is disposed in the mold, the sensing module is disposed in the mold and is covered by the protection structure, and the cooling flow path is located in the protection structure.

Based on the above, in the mold apparatus of the disclosure, the sensing module is cooled by the cooling flow path surrounding the sensing module. Therefore, the mold apparatus can be used in higher temperature processes, and the applicability of the mold apparatus in different processes can be improved.

To make the aforementioned more comprehensible, several embodiments accompanied with drawings are described in detail as follows.

DESCRIPTION OF THE EMBODIMENTS

The disclosure will be more fully described with reference to the drawings of the embodiments. However, the disclosure may be implemented in various forms and should not be limited to the embodiments described herein. The same or similar reference signs denote the same or similar components and will not be repeatedly described in the following paragraphs.

Figure 1A:
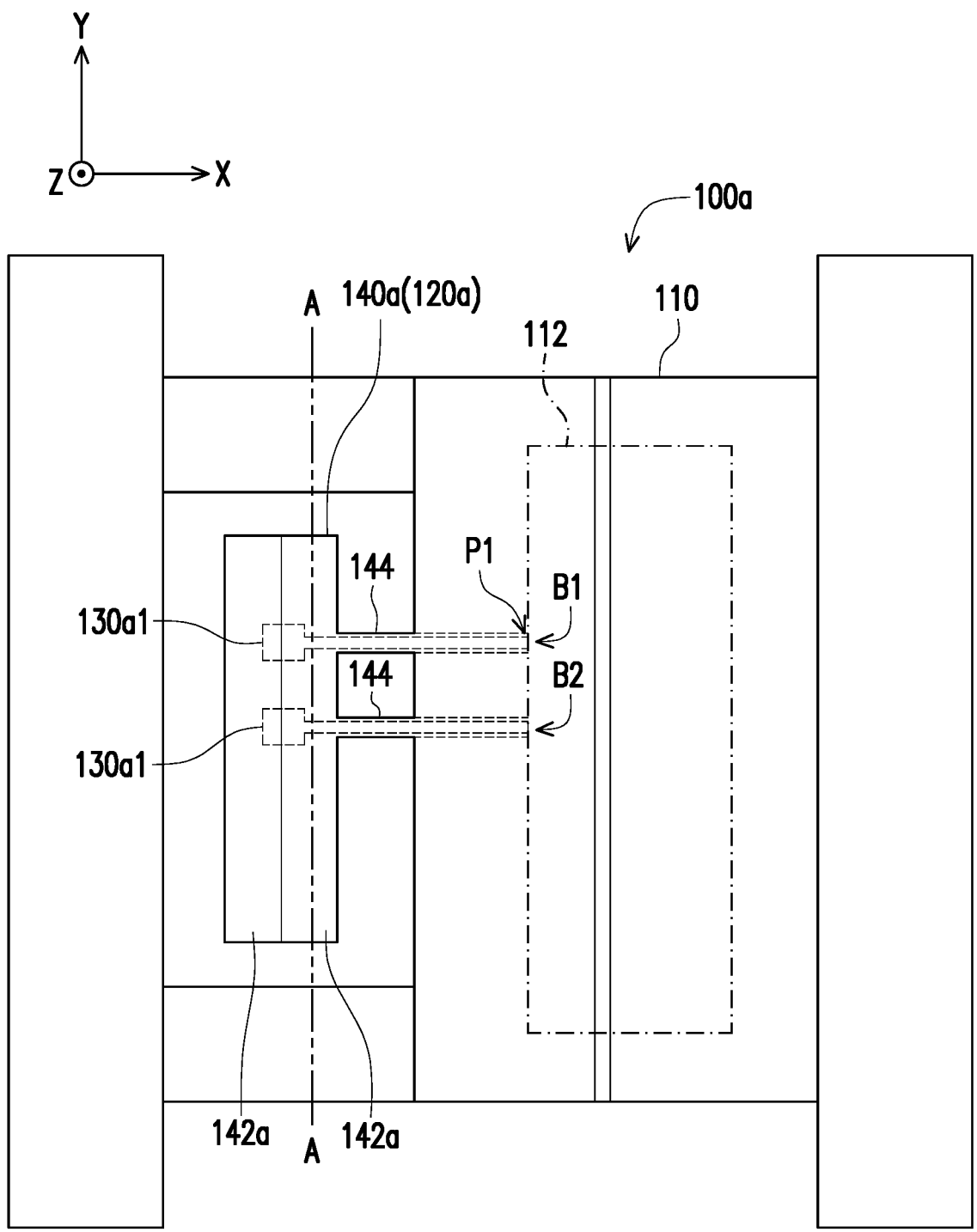
FIG. 1A is a schematic view of a mold apparatus according to an embodiment of the disclosure.

FIG. 1A is a schematic view of a mold apparatus according to an embodiment of the disclosure. X-Y-Z coordinate axes are provided herein to facilitate description of the components. Referring to FIG. 1A, a mold apparatus 100a of this embodiment includes a mold 110, a bearing structure 120a, and a sensing module 130a1. In FIG. 1A, a cavity 112 of the mold 110 is schematically illustrated in a dot-chain line, but its shape and arrangement are not limited thereto. The bearing structure 120a is adapted to provide structural support for the sensing module 130a1. The sensing module 130a1 is adapted to sense at least one of a temperature and a pressure in the cavity 112. The bearing structure 120a of this embodiment is an ejector plate structure 140a, and the sensing module 130a1 is disposed in the bearing structure 120a (the ejector plate structure 140a) to improve space utilization of the mold apparatus 100a. The ejector plate structure 140a includes a pair of ejector plates 142a and a plurality of ejector pins 144. The pair of ejector plates 142a are disposed outside the mold 110, and the ejector pins 144 extend from the pair of ejector plates 142a toward the cavity 112 of the mold 110. The ejector pins 144 are adapted to eject components (not shown) in the cavity 112 out of the cavity 112. The mold apparatus 100a of this embodiment is adapted for an injection molding process but is not limited thereto.

As shown in FIG. 1A, the mold apparatus 100a includes two sensing modules 130a1 disposed corresponding to two ejector pins 144. A portion of the sensing module 130a1 is disposed in the pair of ejector plates 142a, and another portion of the sensing module 130a1 is disposed in the ejector pin 144 and extends to the cavity 112 of the mold 110. Herein, one sensing module 130a1 extends to a position B1 of the cavity 112 to measure the temperature and the pressure of the position B1. Another sensing module 130a1 extends to another position B2 of the cavity 112 to measure the temperature and the pressure of the position B2. The mold apparatus 100a measures the temperature and the pressure of the two positions B1 and B2 respectively through the two sensing modules 130a1. Herein, the positions B1 and B2 are any positions in the cavity 112. In addition, the number of the ejector pins 144 of the ejector plate structure 140a is not limited thereto, and the number of the sensing modules 130a1 and the arrangement thereof are also not limited thereto. The user may arrange the sensing module 130a1 according to the requirements to sense the temperature and the pressure of multiple positions of the cavity 112. This is conducive to production, monitoring of process stability, and reduction in the manufacturing cost of the mold apparatus 100a, and at the same time, provides a good data source for future development of smart manufacturing and smart molding.

Figure 1B:
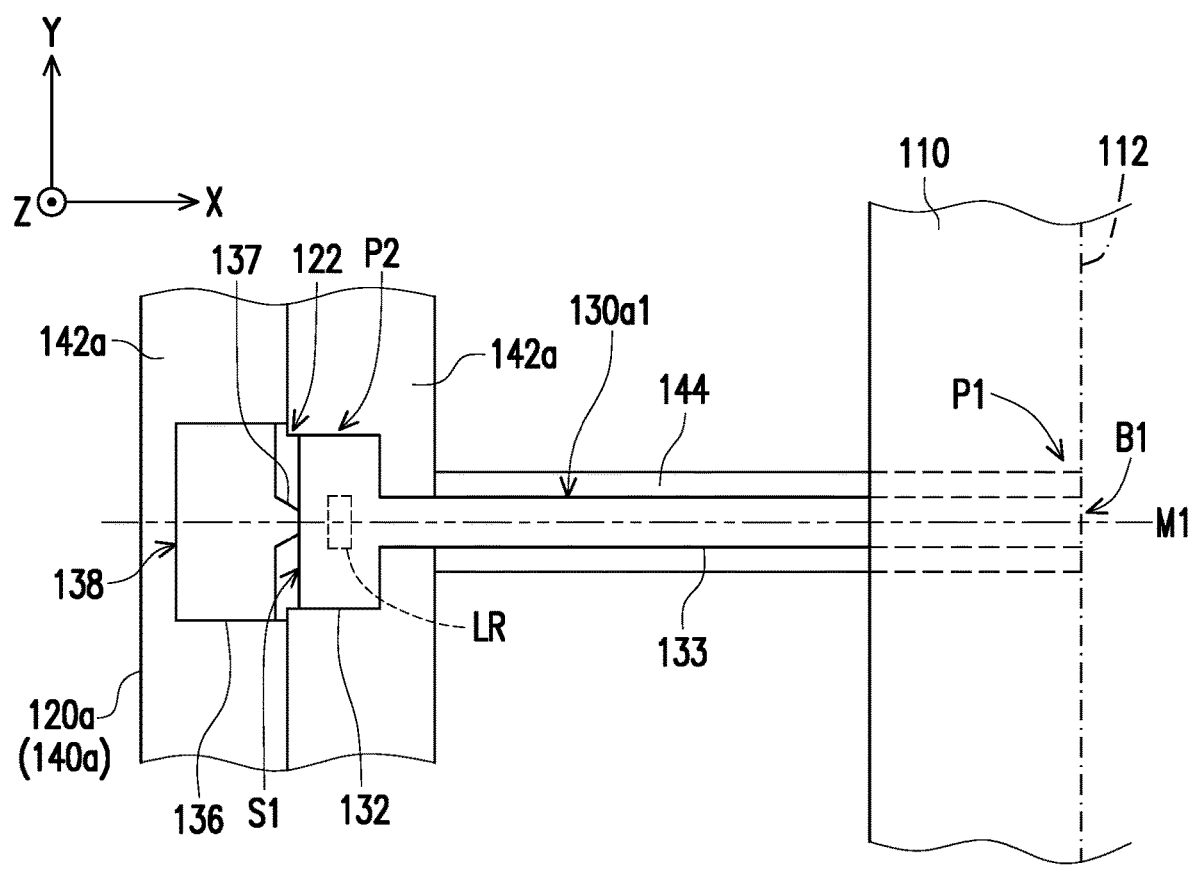
FIG. 1B is a schematic view of some components of the mold apparatus of FIG. 1A.

FIG. 1B is a schematic view of some components of the mold apparatus of FIG. 1A. FIG. 1B is a partial cross-sectional view of FIG. 1A illustrating the arrangement relationship of one sensing module 130a1, the bearing structure 120a, and the mold 110. Referring to FIG. 1B, the sensing module 130a1 includes a temperature sensor 132 and a pressure sensor 136. The temperature sensor 132 of this embodiment is an ejector-pin-type temperature sensor. The temperature sensor 132 has an extension structure 133 and an abutting portion P2. The extension structure 133 extends from the abutting portion P2 along a movement axis M1. The pressure sensor 136 and the abutting portion P2 are disposed (located) in an accommodating space 122 in the bearing structure 120a (in the pair of ejector plates 142a), and the extension structure 133 is disposed at the ejector pin 144 and extends toward the mold 110. A sensing portion P1 of the temperature sensor 132 is disposed at the extension structure 133 and is located in the mold 110, and the sensing portion P1 corresponds to the position B1 in the cavity 112. The temperature sensor 132 senses the temperature at the position B1 in the cavity 112 through the sensing portion P1.

The pressure sensor 136 corresponds to the abutting portion P2 of the temperature sensor 132. Herein, the temperature sensor 132 is movably disposed in the mold 110 and the bearing structure 120a along the movement axis M1, and the sensing portion P1 and the abutting portion P2 are respectively located at two opposite ends of the temperature sensor 132 on the movement axis M1. When the sensing portion P1 of the temperature sensor 132 is subjected to a pressure from the position B1 of the cavity 112, the temperature sensor 132 is adapted to be pushed to move toward the pressure sensor 136 along the movement axis M1, and the abutting portion P2 of the temperature sensor 132 is moved to push the pressure sensor 136. In other words, the pressure sensor 136 is squeezed by the movement of the temperature sensor 132 to measure the pressure subjected at the position B1.

Specifically, the pressure sensor 136 and the temperature sensor 132 are disposed coaxially (on the movement axis MD, and a sensing protrusion 137 of the pressure sensor 136 is also located on the movement axis M1. That is, the pressure sensor 136 and the temperature sensor 132 are built-in coaxially. The pressure sensor 136 senses the pressure based on a received pressure of the sensing protrusion 137. As shown in FIG. 1B, the sensing protrusion 137 of this embodiment faces the abutting portion P2 of the temperature sensor 132 and is adapted to be directly abutted by the abutting portion P2. Therefore, the sensing module 130a1 is adapted to simultaneously measure the temperature and the pressure of the position B1 in the cavity 112 through the temperature sensor 132 and the pressure sensor 136.

Figure 2A:
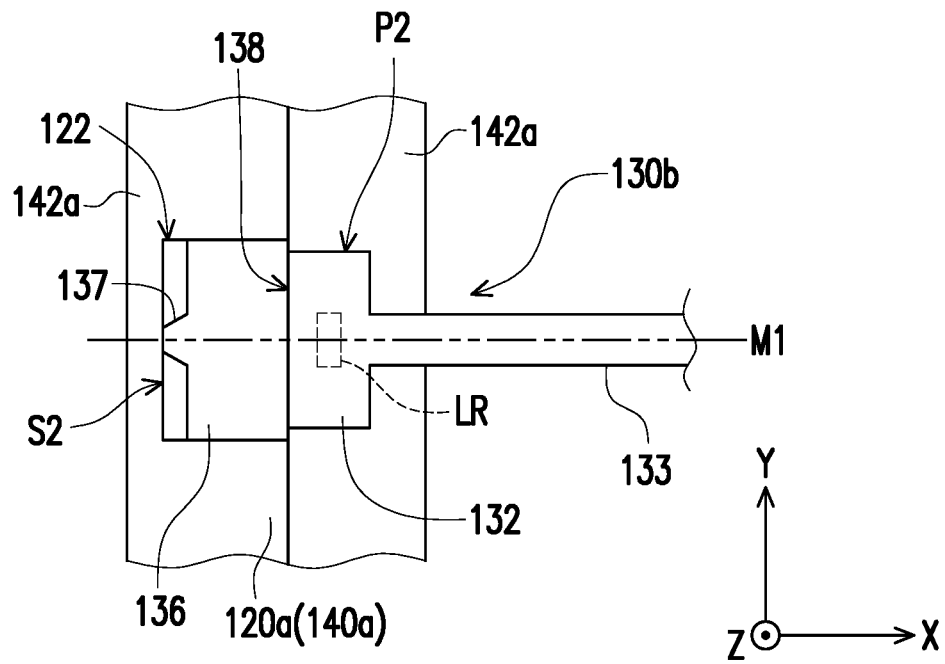
FIG. 2A to FIG. 2C respectively illustrate some components of a mold apparatus according to other embodiments of the disclosure.
Figure 2B:
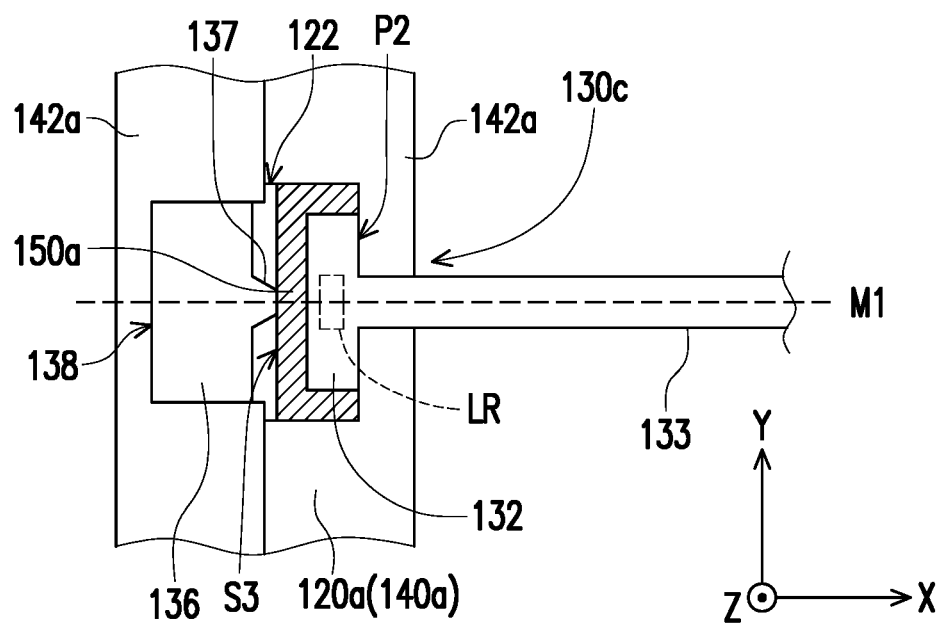
Figure 2C:
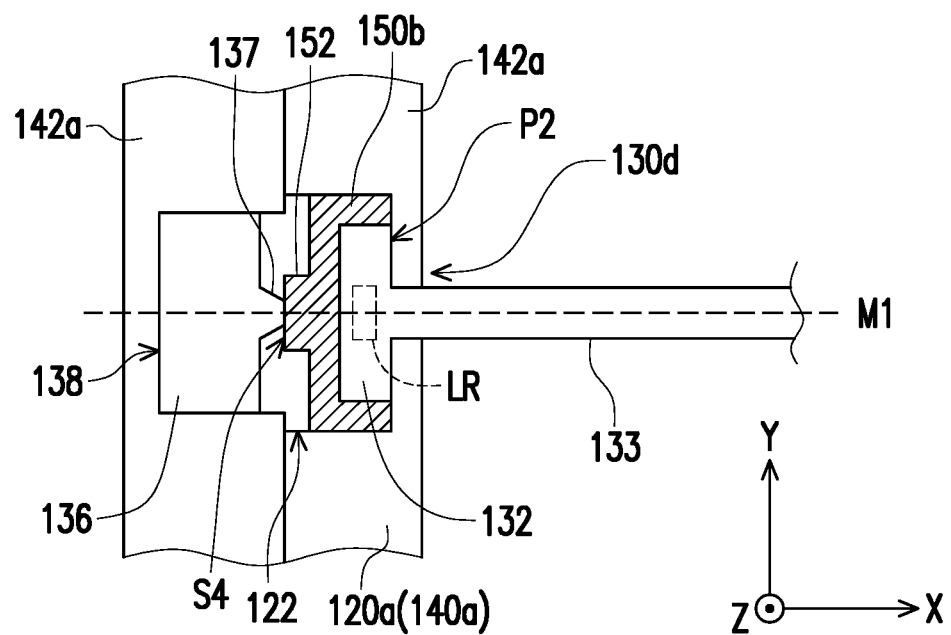

FIG. 2A to FIG. 2C respectively illustrate some components of a mold apparatus according to other embodiments of the disclosure. To clearly illustrate the arrangement of the temperature sensor 132 and the pressure sensor 136, some components (e.g., the ejector pin 144) are omitted from the illustration of the embodiments of FIG. 2A to FIG. 2C. Referring to FIG. 1B and FIG. 2A at the same time, a sensing module 130b of this embodiment is similar to the above embodiment, and the difference between the two lies in that the sensing protrusion 137 of this embodiment faces away from the abutting portion P2 of the temperature sensor 132, and the sensing protrusion 137 is adapted to abut against the bearing structure 120a by the abutment of the abutting portion P2 against the pressure sensor 136. Specifically, the sensing protrusion 137 faces the inner surface of the bearing structure 120a, the pressure sensor 136 has an abutting surface 138 opposite to the sensing protrusion 137, and the abutting surface 138 faces the abutting portion P2. When the temperature sensor 132 is moved along the movement axis M1 under pressure, the abutting portion P2 directly abuts against the abutting surface 138, so that the sensing protrusion 137 directly abuts against the inner surface of the bearing structure 120a. In other words, at this time, the sensing protrusion 137 actually abuts against the inner surface of the bearing structure 120a. Accordingly, it is learned that the sensing protrusion 137 may be directly or indirectly abutted by the abutting portion P2 so that the pressure sensor 136 can sense a pressure. Therefore, the sensing module 130b of this embodiment achieves the same effects as the above embodiment.

Referring to FIG. 1B and FIG. 2B at the same time, a sensing module 130c of this embodiment is similar to the above embodiment, and the difference between the two lies in that a mold apparatus of this embodiment further includes a protection structure 150a, and the protection structure 150a covers the abutting portion P2 of the temperature sensor 132 to provide structural protection. Herein, the protection structure 150a has a substantially C-shape to cover the abutting portion P2. The protection structure 150a is disposed in the bearing structure 120a, and the protection structure 150a is located between the temperature sensor 132 and the pressure sensor 136. As shown in FIG. 2B, the temperature sensor 132, the protection structure 150a, and the pressure sensor 136 are disposed coaxially (on the movement axis MD, and the protection structure 150a is movably disposed in the bearing structure 120a and is adapted to be pushed by the temperature sensor 132. Specifically, when the temperature sensor 132 is moved under pressure, the protection structure 150a directly abuts against the pressure sensor 136 along with the movement of the temperature sensor 132. Herein, the sensing protrusion 137 faces the protection structure 150a, and the protection structure 150a directly abuts against the sensing protrusion 137. Of course, the arrangement of the sensing protrusion 137 is not limited thereto. For example, as shown in FIG. 2A, the sensing protrusion 137 may face away from the protection structure 150a (i.e., facing the inner surface of the bearing structure 120a), so that the sensing protrusion 137 directly abuts against the inner surface of the bearing structure 120a.

In addition, to prevent deformation of the protection structure 150a due to squeezing by the sensing protrusion 137, the hardness of the protection structure 150a is greater than the hardness of the sensing protrusion 137. For example, if the hardness of the sensing protrusion 137 is 38 HRC, the hardness of the protection structure 150a is greater than 38 HRC. Of course, the hardness of the sensing protrusion 137 is not limited thereto. Accordingly, the mold apparatus of this embodiment achieves effects similar to the above embodiment.

Referring to FIG. 2B and FIG. 2C at the same time, a sensing module 130d and a protection structure 150b of this embodiment are similar to the above embodiment, and the difference between the two lies in that the protection structure 150b of this embodiment has a protrusion 152 which extends along the movement axis M1 toward the pressure sensor 136 (i.e., in a direction away from the temperature sensor 132). The protection structure 150b abuts against the pressure sensor 136 through the protrusion 152. Herein, the sensing protrusion 137 directly abuts against the protrusion 152, but the disclosure is not limited thereto. For example, the sensing protrusion 137 may face away from the protection structure 150b (i.e., facing the inner surface of the bearing structure 120a) as shown in FIG. 2A, so that the sensing protrusion 137 directly abuts against the inner surface of the bearing structure 120a. Accordingly, the protection structure 150b of this embodiment achieves the same effects as the protection structure 150a of the above embodiment. Of course, the configurations of the protection structures 150a and 150b are not limited to the above embodiments, and the user may design the protection structures 150a and 150b according to the structural design requirements.

According to the above, the temperature sensor 132 and the pressure sensor 136 may be arranged in multiple possible ways, and the mold apparatus may include the protection structures 150a and 150b. The arrangement of the mold apparatus 100a and the sensing modules 130a1 shown in FIG. 1A may be one or a combination of the arrangements of the sensing modules 130a1, 130b, 130c, and 130d shown in FIG. 1B to FIG. 2C.

Specifically, the sensing protrusion 137 and the abutting portion P2 are located on the same movement axis M1, and the sensing protrusion 137 corresponds to a pressure-sensing surface. The pressure-sensing surface varies according to the arrangement of the sensing protrusion 137. The pressure sensor 136 is adapted to bear the abutting force applied by the abutting portion P2, so that the sensing protrusion 137 abuts against the pressure-sensing surface. For example, in the embodiment shown in FIG. 1B, a pressure-sensing surface S1 is the surface of the abutting portion P2. In the embodiment shown in FIG. 2A, a pressure-sensing surface S2 is the inner surface of the bearing structure 120a. In the embodiment shown in FIG. 2B, a pressure-sensing surface S3 is the surface of the protection structure 150a. In the embodiment shown in FIG. 2C, a pressure-sensing surface S4 is the surface of the protrusion 152 of the protection structure 150b. Accordingly, the sensing modules 130a1, 130b, 130c, and 130d may coaxially measure the temperature and the pressure of any position B1 in the cavity 112.

Figure 3:
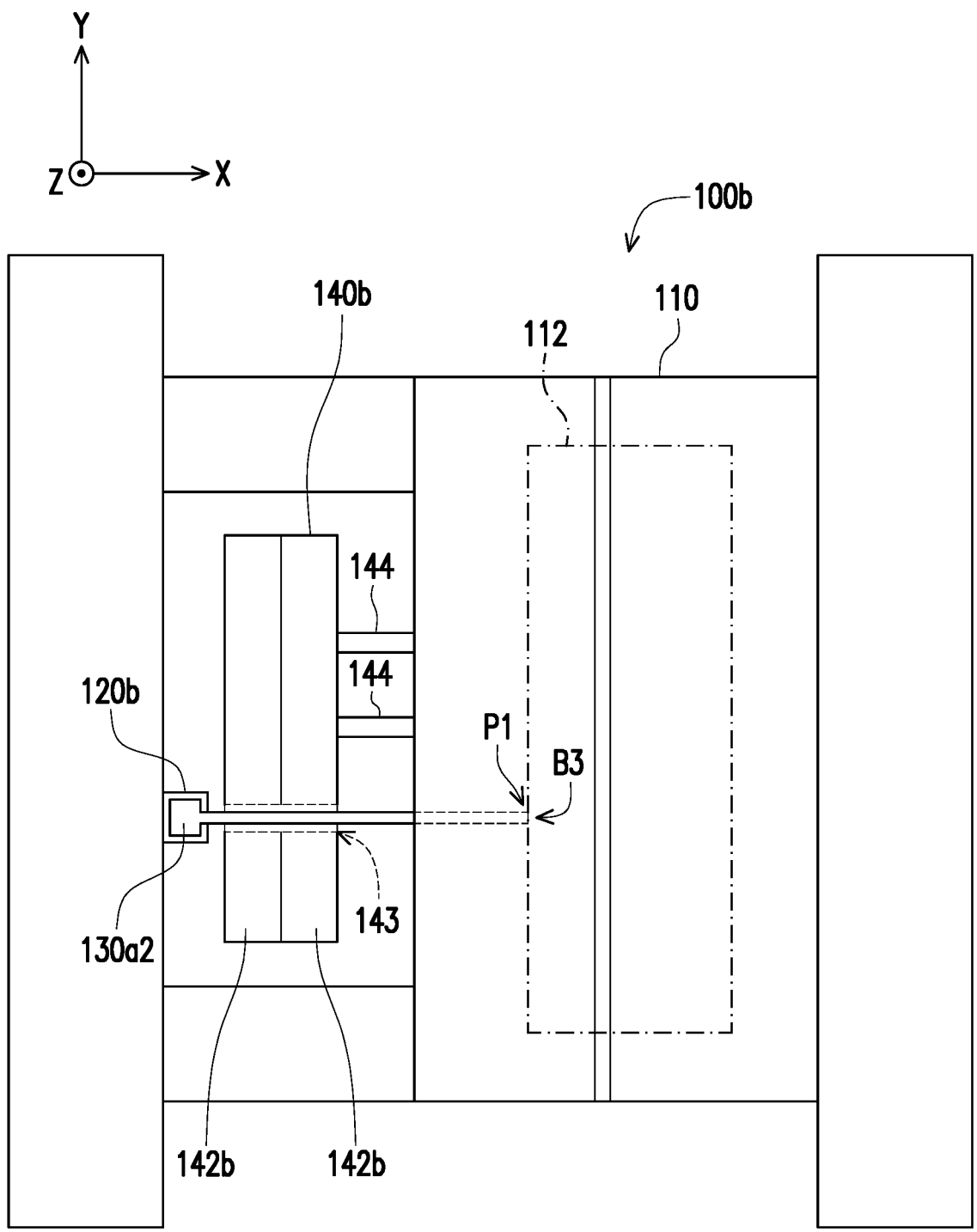
FIG. 3 is a schematic view of a mold apparatus according to another embodiment of the disclosure.

FIG. 3 is a schematic view of a mold apparatus according to another embodiment of the disclosure. Referring to FIG. 1A and FIG. 3 at the same time, a mold apparatus 100b of this embodiment is similar to the above embodiment, and the difference between the two lies in that a bearing structure 120b of this embodiment is not an ejector plate structure 140b. The pair of ejector plates 142b have a through-hole 143, and a sensing module 130a2 is inserted into the ejector plate structure 140b through the through-hole 143. The bearing structure 120b is sleeved on one end of the sensing module 130a2 to provide structural protection, and the other end of the sensing module 130a2 extends into the cavity 112 (shown in a dotted line) of the mold 110 to measure the temperature and the pressure at a position B3 of the cavity 112. The arrangement of the temperature sensor 132 and the pressure sensor 136 of the sensing module 130a2 and/or the protection structures 150a and 150b is similar to the arrangement of the sensing modules 130a1, 130b, 130c, and 130d shown in FIG. 1B to FIG. 2C and will not be repeatedly described herein.

Of course, the arrangement of the sensing module 130a2 is not limited thereto. For example, in another embodiment (not shown), the sensing module 130a2 is disposed outside the ejector plate structure 140b, and a projection of the sensing module 130a2 onto the mold 110 does not overlap with a projection of the ejector plate structure 140b onto the mold 110. In another embodiment (not shown), the mold apparatus 100b includes the sensing module 130a1 and the sensing module 130a2 at the same time. The sensing modules 130a1 and 130a2 and the bearing structures 120a and 120b may be arranged in multiple possible ways, and the user may arrange them according to the requirements.

Figure 4:
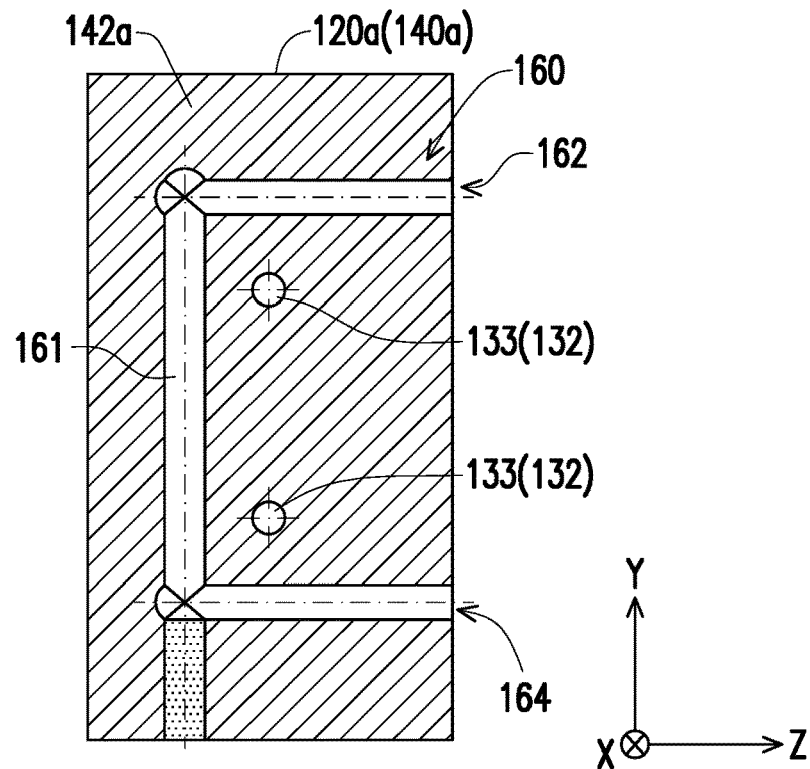
FIG. 4 is a cross-sectional view of the mold apparatus of FIG. 1A.

FIG. 4 is a cross-sectional view of the mold apparatus of FIG. 1A. FIG. 4 is a cross-sectional view taken along line A of FIG. 1A. Referring to FIG. 1A and FIG. 4, to prevent damage to the temperature sensor 132 (shown in FIG. 1B) due to high temperature and limitation on the applicability of the temperature sensor 132 in different processes, the mold apparatus 100a includes a cooling flow path 160, and the sensing module 130a1 is surrounded by the cooling flow path 160. The cooling flow path 160 may be regarded as a mold sensor cooling structure which is adapted to reduce the temperature of the sensing module 130a1. More specifically, the cooling flow path 160 may surround a portion of the temperature sensor 132 other than the sensing portion P1 (shown in FIG. 1A) to locally cool the temperature sensor 132. Accordingly, the temperature sensor 132 can resist higher mold temperature, which improves the applicability of the temperature sensor 132 in different processes. Herein, the temperature sensor 132 is an optical fiber temperature sensor and includes a light receiving unit LR (shown in FIG. 1B to FIG. 2C). The light receiving unit LR is disposed at the abutting portion P2 to receive a temperature signal from the sensing portion P1. Since the temperature sensor 132 is an optical fiber temperature sensor, the temperature signal of the sensing portion P1 is not affected by local temperature reduction of the temperature sensor 132, and the temperature sensed by the temperature sensor 132 is thus not distorted.

As shown in FIG. 4, the cooling flow path 160 is located in the bearing structure 120a (the pair of ejector plates 142a of the ejector plate structure 140a) and surrounds the extension structure 133 of the temperature sensor 132. Herein, the cooling flow path 160 has a flow channel 161, and the flow channel 161 has a water inlet 162 and a water outlet 164. After a cooling liquid with low heat flows into the flow channel 161 through the water inlet 162 and exchanges heat with the two extension structures 133, a cooling liquid with high heat leaves from the water outlet 164. The flow channel 161 has a substantially C-shape and simultaneously surrounds and cools the two extension structures 133. Of course, the design of the flow channel 161 of the cooling flow path 160 and the arrangement position thereof are not limited thereto.

For example, in another embodiment (not shown), the cooling flow path 160 includes two flow channels 161 to respectively surround and cool the two extension structures 133. In another embodiment (not shown), the cooling flow path 160 is located in the bearing structures 120a and 120b and has a helical flow channel covering the abutting portion P2 and/or the extension structure 133. In another embodiment (not shown), the cooling flow path 160 is located in the protection structures 150a and 150b shown in FIG. 2B and FIG. 2C to cool the abutting portion P2 of the temperature sensor 132. The user may configure the cooling flow path 160 according to the structural design requirements to achieve the effect of reducing the temperature of the temperature sensor 132, so that the mold apparatus 100a can be used in higher temperature processes, and the applicability of the mold apparatus 100a in different processes can be improved. The cooling flow path 160 is not disposed in the mold 110, so that the temperature of the mold 110 would not be affected by the cooling flow path 160, and the mold 110 would not be hindered from reaching its working temperature.

Figure 5:
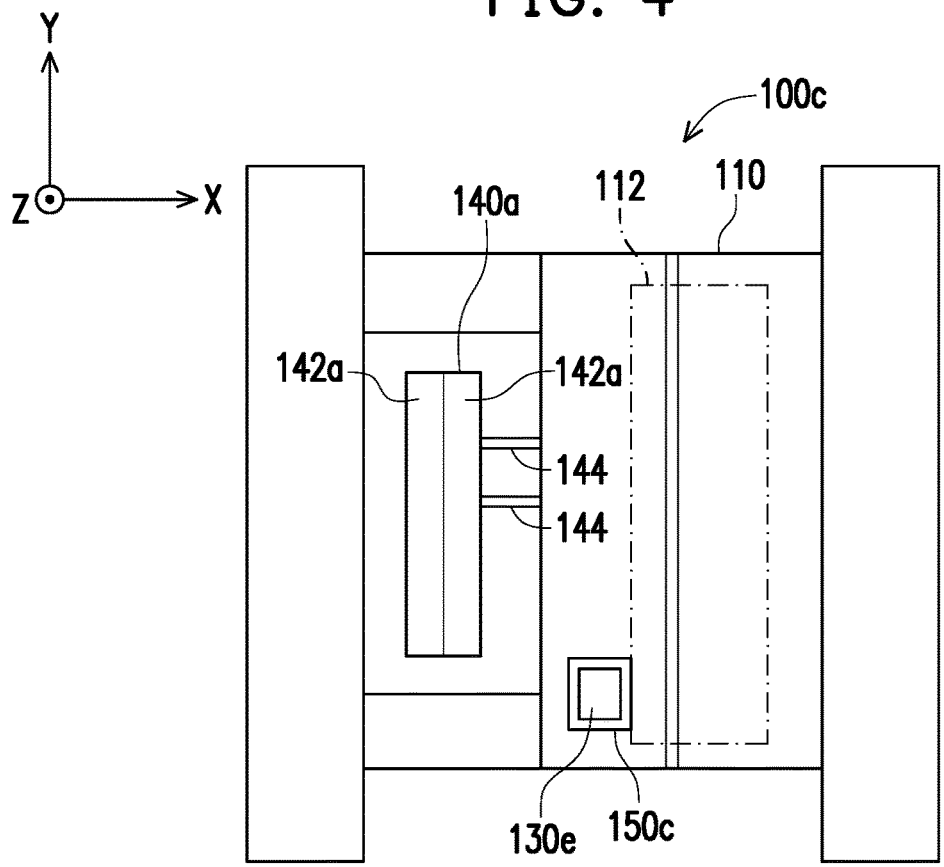
FIG. 5 is a schematic view of a mold apparatus according to another embodiment of the disclosure.

FIG. 5 is a schematic view of a mold apparatus according to another embodiment of the disclosure. Referring to FIG. 5, a sensing module 130e and a protection structure 150c of this embodiment are disposed in the mold 110. Specifically, the sensing module 130e is covered by the protection structure 150c, and the cooling flow path 160 is located in the protection structure 150c. Herein, it is possible that the temperature sensor is not an ejector-pin-type temperature sensor. The sensing module 130e and the cooling flow path 160 of this embodiment achieve effects similar to the above embodiment.

In summary of the above, in the sensing module of the mold apparatus of the disclosure, since the temperature sensor and the pressure sensor are disposed coaxially (on the movement axis), the sensing module is adapted to simultaneously measure the temperature and the pressure of any position in the cavity, which reduces the installation and manufacturing costs of the sensor of the mold apparatus. Herein, the temperature sensor and the pressure sensor may be combined in multiple possible ways. Specifically, the temperature sensor is movably disposed in the mold and the bearing structure along the movement axis. The sensing portion of the temperature sensor senses the temperature of any position in the cavity and transmits the temperature signal to the abutting portion of the temperature sensor. When the temperature sensor is subjected to a pressure from this position, the abutting portion of the temperature sensor is moved along the movement axis and squeezes the pressure sensor to sense the pressure at this position. The sensing protrusion of the pressure sensor and the abutting portion are located on the same movement axis, and the sensing protrusion corresponds to a pressure-sensing surface. The pressure-sensing surface varies according to the arrangement of the sensing protrusion. For example, when the sensing protrusion faces the abutting portion, the pressure-sensing surface is the surface of the abutting portion. When the sensing protrusion faces the bearing structure, the pressure-sensing surface is the inner surface of the bearing structure. In addition, the mold apparatus may include a protection structure disposed between the temperature sensor and the pressure sensor, and the protection structure provides protection for the abutting portion. The protection structure abuts against the pressure sensor, and when the sensing protrusion faces the abutting portion, the pressure-sensing surface is the surface of the abutting portion. The hardness of the protection structure is greater than the hardness of the sensing protrusion.

In addition, the mold apparatus of the disclosure further includes a cooling flow path to cool the temperature of the temperature sensor and prevent damage to the temperature sensor due to high temperature. The cooling flow path is located in the bearing structure and/or the protection structure, and the cooling flow path may exchange heat with a portion covering the temperature sensor other than the sensing portion to locally reduce the temperature of the temperature sensor. Accordingly, the temperature sensor can resist higher mold temperature, so that the applicability of the temperature sensor in different processes can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A mold apparatus comprising:
   a mold having a cavity;
   a cooling flow path; and
   a sensing module adapted to sense at least one of a temperature and a pressure in the cavity, wherein the sensing module is surrounded by the cooling flow path, the sensing module comprises a temperature sensor and a pressure sensor, the temperature sensor has a sensing portion and an abutting portion, the pressure sensor corresponds to the abutting portion,
   wherein the cooling flow path surrounds a portion of the temperature sensor other than the sensing portion to locally cool the temperature sensor.

2. The mold apparatus according to claim 1, further comprising a bearing structure, wherein the sensing portion is located in the mold, the abutting portion is located in the bearing structure, the pressure sensor is disposed in the bearing structure, and the abutting portion is adapted to abut against the pressure sensor by the pressure in the cavity.

3. The mold apparatus according to claim 2, wherein the cooling flow path is located in the bearing structure.

4. The mold apparatus according to claim 2, wherein the temperature sensor is an ejector-pin-type temperature sensor, and the bearing structure is an ejector plate structure.

5. The mold apparatus according to claim 2, wherein the temperature sensor is an optical fiber temperature sensor and comprises a light receiving unit, and the light receiving unit is disposed at the abutting portion.

6. The mold apparatus according to claim 2, further comprising a protection structure, wherein the protection structure covers the abutting portion, and the cooling flow path is located in the protection structure.

7. The mold apparatus according to claim 1, further comprising a protection structure, wherein the protection structure is disposed in the mold, the sensing module is disposed in the mold and is covered by the protection structure, and the cooling flow path is located in the protection structure.

* * * * *